US007751510B2

(12) United States Patent
Budianu et al.

(10) Patent No.: US 7,751,510 B2
(45) Date of Patent: Jul. 6, 2010

(54) SIMPLIFIED CHANNEL AND INTERFERENCE ESTIMATION WITH DEDICATED PILOT TONES FOR OFDMA

(75) Inventors: Petru Cristian Budianu, San Diego, CA (US); Dhananjay Ashok Gore, San Diego, CA (US); Alexei Gorokhov, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 912 days.

(21) Appl. No.: 11/493,643

(22) Filed: Jul. 25, 2006

(65) Prior Publication Data

US 2007/0025460 A1 Feb. 1, 2007

Related U.S. Application Data

(60) Provisional application No. 60/702,682, filed on Jul. 26, 2005.

(51) Int. Cl.
*H03D 1/04* (2006.01)
*H04B 1/10* (2006.01)

(52) U.S. Cl. ........................ 375/346; 370/203

(58) Field of Classification Search ......... 375/346–350; 370/203–211
See application file for complete search history.

(56) References Cited

U.S. PATENT DOCUMENTS

| 6,141,393 | A * | 10/2000 | Thomas et al. | 375/347 |
| 7,471,728 | B2 * | 12/2008 | Brutel et al. | 375/260 |
| 2003/0050071 | A1 * | 3/2003 | Shurvinton | 455/452 |
| 2004/0228388 | A1 * | 11/2004 | Salmenkaita | 375/132 |
| 2005/0243939 | A1 * | 11/2005 | Jung et al. | 375/260 |

FOREIGN PATENT DOCUMENTS

| EP | 1 148 674 A2 * | 10/2001 |
| WO | WO 01/41387 | 6/2001 |
| WO | WO 2004/102824 | 11/2004 |
| WO | WO 2006/010159 | 1/2006 |
| WO | 2007014345 A1 | 2/2007 |

OTHER PUBLICATIONS

Hara et al., "Performance of channel estimation techniques for MC-CDMA systems," 57th IEE Semiannual Vehicular Technology Conference, Proceedings, vol. 4, pp. 2115-2119 (2003).
Suthaharan et al., "A computationally efficient channel estimation with signal detection for MIMO-OFDM systems," Personal, Indoor and Mobile Radio Communications, 14th IEEE Proceedings, vol. 2, pp. 1245-1249 (2003).
International Search Report & Written Opinion dated Nov. 28, 2006 for PCT Application Serial No. PCT/US2006/029521, 11 Pages.
Chilean OA mailed Dec. 9, 2008 for Chilean Application No. 1941-2006, 5 pages.
European OA mailed May 7, 2008 for European Application No. 06 788 852.9, 17 pages.
Malaysian OA mailed Apr. 30, 2009 for Malaysian Application No. PI 20063586, 2 pages.
Office Action mailed Aug. 27, 2009 for European Patent Application Serial No. 06788852.9, 3 pages.

* cited by examiner

*Primary Examiner*—Curtis B Odom
(74) *Attorney, Agent, or Firm*—Turocy & Watson, LLP

(57) ABSTRACT

Estimation of channel characteristics and interference level in a time-varying multi-carrier multi-user systems is carried out concurrently. To perform the estimation, a multitude of data symbols and dedicated pilot symbols are transmitted over the channel. The estimate of the interference level is used to estimate the channel parameters.

22 Claims, 8 Drawing Sheets

SIMPLIFIED CHANNEL AND INTERFERENCE ESTIMATION WITH DEDICATED PILOT TONES FOR OFDMA

CLAIM OF PRIORITY UNDER 35 U.S.C. §119

The present application for patent claims priority to Provisional Application No. 60/702,682 entitled "A Method and Apparatus for Channel and Interference with Dedicated Pilot Tones" filed Jul. 26, 2005, and assigned to the assignee hereof and hereby expressly incorporated by reference herein.

BACKGROUND

The present disclosure relates to wireless communication systems, and more particularly to estimation of channel parameters and of interference level in such systems.

In a wireless communication system, it is often necessary to estimate the response of a wireless channel from a transmitter to a receiver. The channel estimate may be used for various purposes such as data detection, time synchronization, frequency correction, spatial processing, rate selection, and so on. Channel estimation is typically performed by transmitting a pilot signal containing pilot symbols that are known a priori by both the transmitter and receiver. The receiver can then estimate the channel gains as a ratio of the received pilot symbols over the known pilot symbols.

The pilot signal is typically impaired by both noise and interference. These impairments degrade the quality of the channel estimate obtained by the receiver based on the received pilot signal. The noise can come from various sources such as the wireless channel, receiver properties, and so on. Noise impairment can normally be addressed by transmitting the pilot signal in a proper manner and/or for a sufficient period of time such that the receiver can obtain the desired quality for the channel estimate. The interference can result from multiple transmitters transmitting their pilot signals simultaneously. These transmitters may be for different base stations in the system, different antennas of the same base station, and so on. In any case, the pilot signal from each transmitter acts as interference to the pilot signals from other transmitters. This pilot interference degrades the quality of the channel estimate.

Often it is desired to estimate the channel and the level of interference. On the forward link (FL), common pilot symbols are known to have been used. In orthogonal frequency division multiplexing (OFDMA) systems, such common pilot symbols are typically scattered over the entire bandwidth shared by all the users. In a traditional single-antenna transmission, such common pilot symbols may be exploited by all the users for the purpose of FL channel estimation. The bandwidth and channel coherence time values that are typical in cellular applications render common pilot tones particularly useful.

It is easy to show that the relative bandwidth efficiency of the common pilot versus dedicated pilot may be made by a comparison between the total number of degrees of freedom in a broadband channel corresponding to the total shared bandwidth, estimated with the common pilot, and the number of degrees of freedom in a narrow-band sub-channel allocated per user times the number of such narrow-band sub-channels. For bandwidth and channel coherence time values that are typical in cellular applications, this balances in favor of the common pilot. Nevertheless, the dedicated pilot approach has a number of attractive features Thus, there exists a need to provide a method and apparatus to provide a simplified channel and interference estimation with dedicated pilot tones for OFDMA.

SUMMARY

Estimation of channel parameters and the interference level in time-varying multi-carrier multi-user systems is carried out concurrently. To perform the estimation, a plurality of data symbols and dedicated pilot symbols are transmitted over the channel. The plurality of data symbols, for one or more users, over a time-frequency region are received. The plurality of dedicated pilot symbols, for the one or more users, disposed among the plurality of data symbols in the time-frequency region are received. The power of the interference for the time-frequency region is estimated. The channel parameters, for the time-frequency region, are estimated using the estimate of the power of the interference.

DETAILED DESCRIPTION

In accordance with the present disclosure, the estimation of channel characteristics and of the interference level in a time-varying multi-carrier multi-user OFDMA system is carried out concurrently. To estimate the channel and the interference level, in accordance with the present disclosure, a multitude of pilot symbols are disposed among the data symbols transmitted. In OFDMA systems, the dedicated pilot symbols are typically placed within the traffic band of the user, in a somewhat uniform manner in order to achieve channel interpolation across frequency and time. The relative bandwidth efficiency of the common pilot symbols versus dedicated pilot symbols is related to a comparison between the total number of degrees of freedom in a broadband channel corresponding to the total shared bandwidth, estimated with the common pilot, and the number of degrees of freedom in a narrow-band sub-channel allocated per user multiplied by the number of such narrow-band sub-channels.

The use of the dedicated pilot tones, in accordance with one aspect of the present disclosure, provides a number of advantages. First, dedicated pilot tones that are scattered over the user traffic bandwidth may be used to estimate the interference level as seen by the user, particularly in synchronous multi-cell designs where the interference level may be assumed quasi-static across any given sub-channel. Second, dedicated pilot symbols may support channel estimation for any sub-channel user sensitive signaling, such as adaptive beamforming. In channel sensitive signaling, a set of dedicated pilot symbols may be transmitted according to the desired channel-sensitive signaling. As is known, common pilot symbols are broadcast to all the users and therefore are not adapted to carry user-specific signature whereas dedicated pilot tones in accordance with the present disclosure are adapted to carry user-specific signature.

Figure 1:
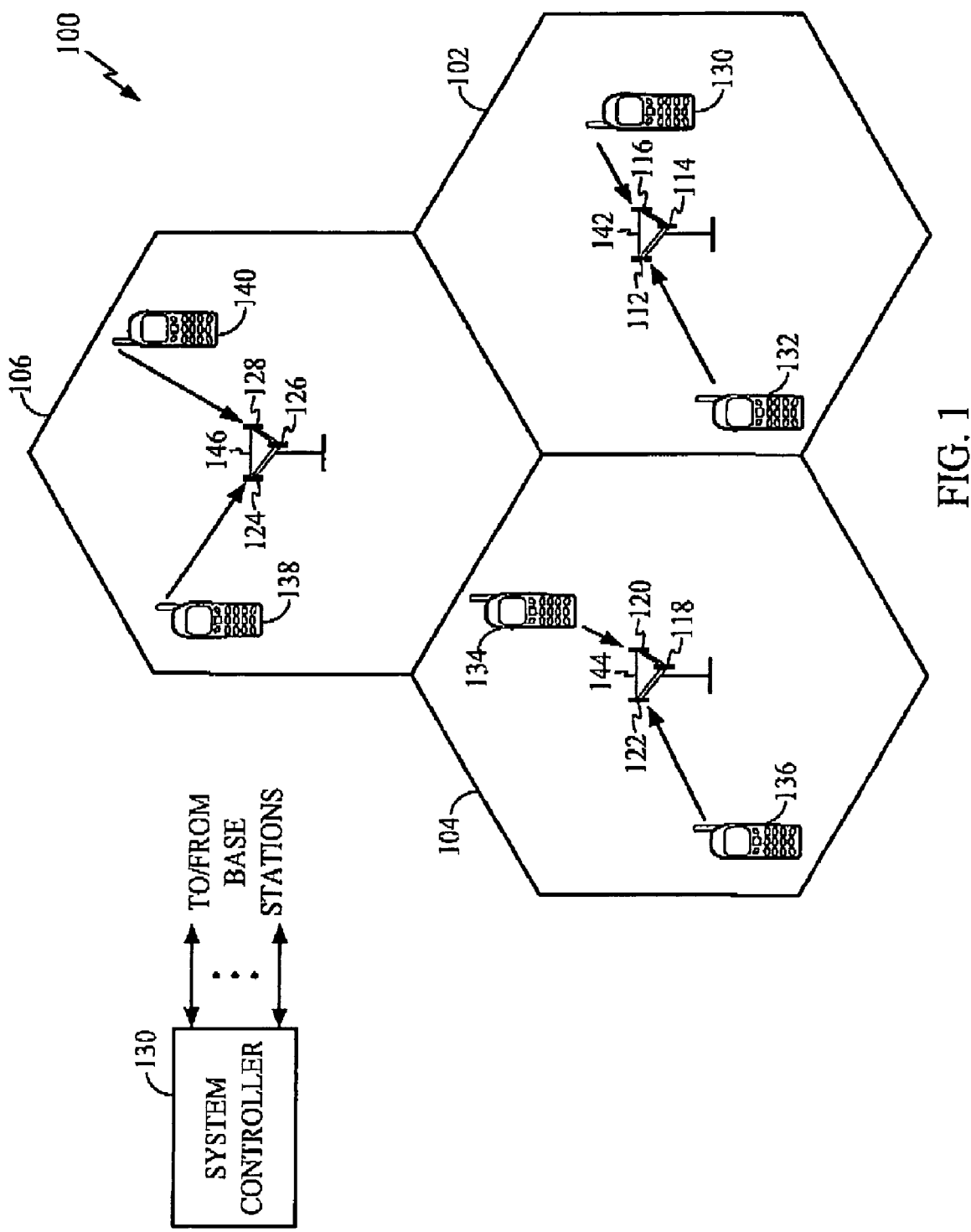
FIG. 1 illustrates some aspects of a multiple access wireless communication system according to an embodiment.

Referring to FIG. 1, a multiple access wireless communication system according to one embodiment is illustrated. A multiple access wireless communication system 100 includes multiple cells, e.g. cells 102, 104, and 106. In the embodiment of FIG. 1, each cell 102, 104, and 106 may include an access point 150 that includes multiple sectors. The multiple sectors may be formed by groups of antennas each responsible for communication with access terminals in a portion of the cell. In cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell includes several access terminals which may be in communication with one or more sectors of each access point. For example, access terminals 130 and 132 are in communication base station 142, access terminals 134 and 136 are in communication with access point 144, and access terminals 138 and 140 are in communication with access point 146.

It can be seen from FIG. 1 that each access terminal 130, 132, 134, 136, 138, and 140 is located in a different portion of it respective cell relative to each other access terminal in the same cell. Further, each access terminal may be a different distance from the corresponding antenna groups with which it is communicating. Both of these factors provide situations, due to environmental and other conditions in the cell, which cause different channel conditions to be present between each access terminal and the corresponding antenna group with which it is communicating.

As used herein, an access point may be a fixed station used for communicating with the terminals and may also be referred to as, and include some or all the functionality of, a base station. An access terminal may also be referred to as, and include some or all the functionality of, a user equipment (UE), a wireless communication device, a terminal, a mobile station or some other terminology.

Figure 2:
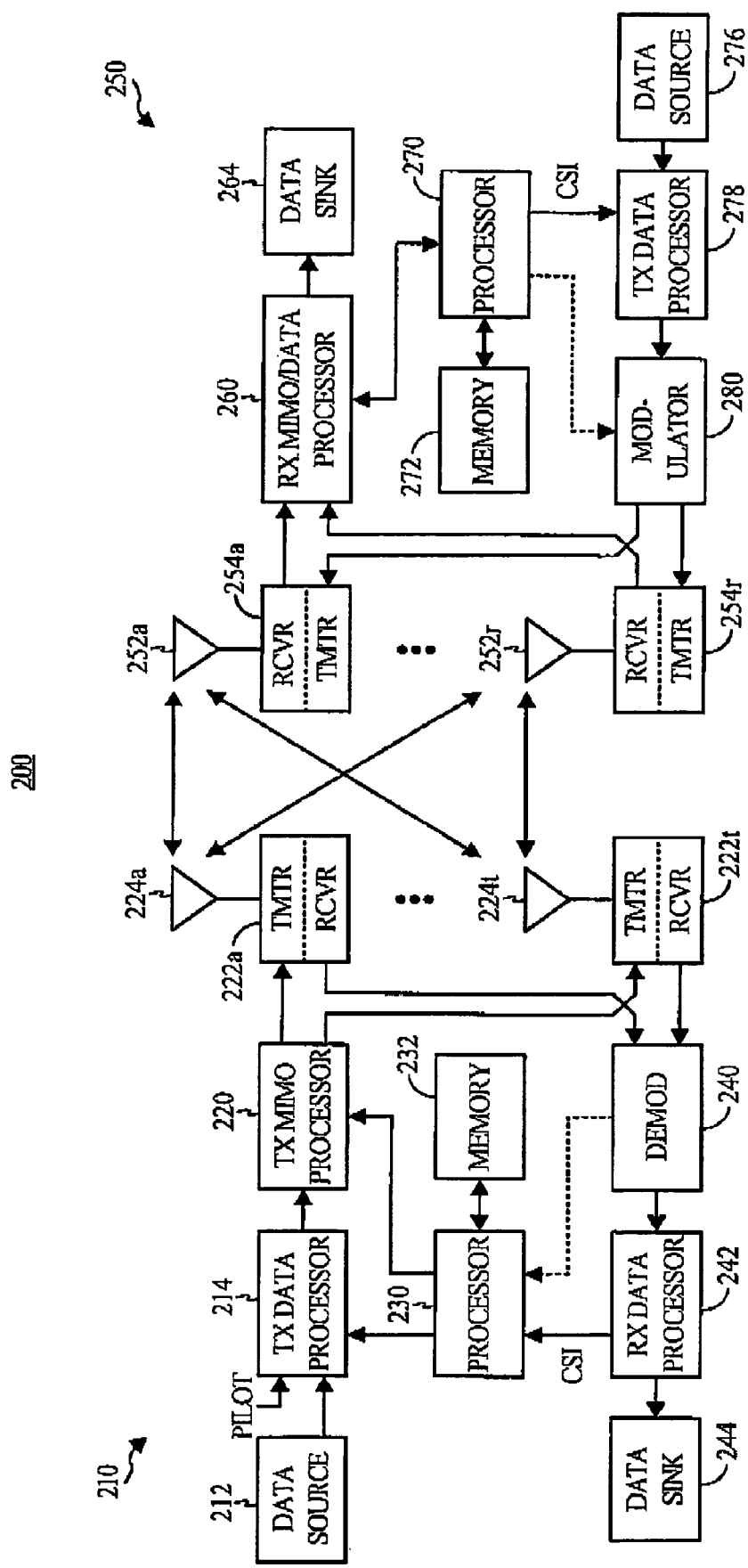
FIG. 2 illustrates some aspects of a transmitter and receiver in a multiple access wireless communication system.

Referring to FIG. 2, one embodiment of a transmitter and receiver in a multiple access wireless communication system is illustrated, 200. At transmitter system 210, traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. In some embodiments, TX data processor 214 applies precoding weights to the symbols of the data streams based upon the user and the antenna from which the symbols are being transmitted. In some embodiments, the precoding weights may be generated based upon an index to a codebook generated at the transceiver, 254 and provided as feedback to the transceiver, 222 which has knowledge of the codebook and its indices. Further, in those cases of scheduled transmissions, the TX data processor 214 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. As discussed above, in some embodiments, the packet format for one or more streams may be varied according to the rank information that is transmitted from the user.

The modulation symbols for all data streams are then provided to a TX MIMO processor 220, which may further process the modulation symbols (e.g., for OFDM). TX MIMO processor 220 then provides $N_T$ modulation symbol streams to $N_T$ transceivers (TMTR) 222a through 222t. In certain embodiments, TX MIMO processor 220 applies preceding weights to the symbols of the data streams based upon the user to which the symbols are being transmitted to and the antenna from which the symbol is being transmitted from that user channel response information.

Each transceiver, 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective transceiver, (RCVR) 254. Each transceiver, 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ transceivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Processor 270 then provides estimated (CSI), which may comprise various types of information regarding the communication link and/or the received data stream. For example; the CSI may comprise only the operating SNR. The CSI is then processed by a TX data processor 278, which also receives traffic data for a number of data streams from a data source 276, modulated by a modulator 280, conditioned by transceivers 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to recover the CSI reported by the receiver system. The reported quantized information e.g. CQI is then provided to processor 230 and used to (1) determine the data rates and coding and modulation schemes to be used for the data streams and (2) to generate various controls for TX data processor 214 and TX MIMO processor 220.

A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension.

Generally, the transmission bandwidth is divided into hop regions, the symbols of one hop region being assigned to multiple users and being processed together, by the access terminal or the access point, for the multiple users assigned to the hop region. One hop region consists of the symbols transmitted in $N_S$ successive OFDM symbols, over the same contiguous set of $N_T$ tones. So, there are $N_S \times N_T$ symbols in one hop region. For the sake of clarity, the number of symbols transmitted in one OFDM symbol is equal to the number of (orthogonal) tones in that symbol.

In certain aspects, there may be Q users that share one hop region. The term user is transposable with the term "layer" as used herein. In this aspect, a single terminal may correspond to multiple users, as it may transmit multiple streams, if it has multiple transmit antennas. Also, in some cases, each terminal may only transmit a single layer and be one user.

The vector of received symbols in one hop region, denoted by y, is an $N_S N_T \times 1$ vector of complex numbers, given by $$y = \sum_{q=1}^{Q} \Delta_q h^{(q)} \cdot S^{(q)} + n_0,$$

The first $N_T$ elements of y (and all the other vectors in the equation above) correspond to the channel for the tones of the first OFDM symbol, and so on.

$\Delta_q^2$, were q=1, ..., Q, is the power offset of user q; these coefficients are assumed known.

$S^{(q)}$, were q=1, ..., Q, $N_S N_T \times 1$ vector of complex numbers, is the vector of modulation symbols transmitted by user q within one hop region.

$h^{(q)}$, q=1, ..., Q, $N_S N_T \times 1$ vector of complex numbers, is the frequency domain channel of user q. The channel coefficients $h^{(q)}$ may be assumed independent among users. For each user, $h^{(q)}$ is in general considered a complex Gaussian function with a zero mean and a known covariance matrix.

$n_0$ $N_S N_T \times 1$ is a vector of complex numbers, is the CAWGN (which includes the interference), and is assumed to have a zero mean and a covariance matrix $\sigma^2 I$. The noise variance $\sigma^2$ is unknown.

In some aspects, this model may be used to estimate the channel coefficients of all users and the interference. For this, dedicated pilot symbols are inserted among the data symbols in a give hop region. The estimation will be based on the received pilot symbols and on the knowledge of the statistical properties of the channel.

A description of one type of channel model is provided below, although other channel models may be utilized with the approaches described herein. The statistical properties of the channel are assumed to be at least somewhat understood in modeling the channel. For each user, the channel coefficients over one hop region may be assumed to be correlated. If this is the case, the following approximations may be accurate enough to be utilized for channel estimation.

The structure of the channel covariance matrix of one user has at most three significant eigenvalues, and the corresponding eigenvectors can be approximated by analytical expressions:

$$E\{h^{(q)} h^{(q)H}\} \approx \sum_{i=1}^{3} \Lambda_i^{(q)} U_i U_i^H,$$

where $U_1$, $U_2$, $U_3$ are explained below.

The following definition of the Kronecker product may be utilized in approximating the covariance matrix.

Given the vectors $a_{n \times 1}$ and $b_{m \times 1}$, their Kronecker product $c_{mn \times 1} := a_{n \times 1} \otimes b_{m \times 1}$ is defined as:

$$c := \begin{bmatrix} a_1 b \\ a_2 b \\ \vdots \\ a_n b \end{bmatrix}$$

$$= [a_1 b_1, a_1 b_2, \ldots, a_1 b_m, a_2 b_1, a_2 b_2, \ldots, a_2 b_m, \cdots, a_n b_1, a_n b_2, \ldots, a_n b_m]^T.$$

Further the following vectors may be defined:

$$U_{N_s, 0} := \frac{1}{\sqrt{N_s}} [1, \ldots 1]^T \quad N_s \times 1 \text{ Vector;}$$

$$U_{N_s, 1} := \sqrt{\frac{3}{N_s(N_s^2 - 1)}} [-(N_s - 1) : 2 : (N_s - 1)]^T \quad N_s \times 1 \text{ vector;}$$

$$U_{N_t, 0} := \frac{1}{\sqrt{N_t}} [1, \ldots 1]^T \quad N_t \times 1 \text{ vector;}$$

$$U_{N_t, 1} := \sqrt{\frac{3}{N_t(N_t^2 - 1)}} [-(N_t - 1) : 2 : (N_t - 1)]^T \quad N_t \times 1 \text{ vector.}$$

The following 3 vectors of size $N_S N_t \times 1$ may be called approximative eigenvectors and they may be used instead of the real eigenvectors for the estimation of the channel corresponding to the data symbols:

$$U_1 := U_{N_S, 0} \otimes U_{N_t, 0}; \quad U_2 := U_{N_S, 0} \otimes U_{N_t, 1};$$
$$U_3 := U_{N_S, 1} \otimes U_{N_t, 0}.$$

In some aspects, it may be that the first eigenvalue is at least one order of magnitude larger than the other two. The structure of the covariance matrix described previously may be utilized to provide the following approximate representation of the channel.

The channel of each user over the hop region may be written as a random function of time and frequency $\xi^{(q)}(t, f)$. Then, $\xi^{(q)}(t, f)$ can be approximated accurately by the first three terms of the Taylor series expansion:

$$\xi^{(q)}(t, f) \approx \xi^{(q)}(t_0, f_0) + \frac{\partial \xi^{(q)}(t, f)}{\partial f}\bigg|_{(t_0, f_0)} (f - f_0) + \frac{\partial \xi^{(q)}(t, f)}{\partial t}\bigg|_{(t_0, f_0)} (t - t_0)$$

Thus, in this approximation, the channel over one hop region may be characterized by three complex parameters.

First, if $(t_0, f_0)$ is defined to be the center of symmetry of the hop region, and the channel of one user corresponding to a symbol of coordinates $(n_S, n_T)$ may be written as follows:

$$h^{(q)}(n_S, n_T) \approx \alpha^{(q)} + \beta_F^{(q)}(n_T - n_{T0}) + \beta_T^{(q)}(n_S - n_{S0}),$$

where $n_{T0} := (N_T+1)/2$ and $n_{S0} := (N_S+1)/2$ are the coordinates of the center of the hop region, $\alpha^{(q)}$ is the DC component and $\beta_F^{(q)}, \beta_T^{(q)}$ are the slopes in frequency and time respectively.

In one aspect, the pilot symbol within a hop region are placed in a pattern that satisfies the following conditions: there are total $N_P$ pilot symbols (in one hop region), the pilot symbols are grouped in 4 clusters, each cluster having $M_Q$ symbols; thus $N_P = 4M_Q$, the pilot symbols of one cluster occupy a contigous region in the time-frequency domain, such that, for each user, the variations of the channel within the symbols of one cluster are as small as possible, and the pilot placement scheme is symmetric with respect to the center of symmetry of the hop region. However, other pilot placement patterns and methodologies may be utilized.

In one aspect, all clusters have the same number of pilot symbols, denoted by $M_Q$. However, this need not be the case. The number of clusters is denoted by $N_C$, and we have $N_P = N_C \times M_Q$.

In certain aspects, the number of users that share one hop region does not exceed the cluster size: $Q \leq M_Q$.

In some aspects, to allow multiplexing, the pilot symbols of one user that belong to the same cluster are scrambled with a scrambling sequence; for simplicity, each user uses the same scrambling sequence for all clusters. The scrambling sequences of different users may be orthonormal vectors of length $M_Q$, and they are assumed to have unit modulus elements. There can be at most $M_Q$ such sequences, denoted by $s_k, k=1, \ldots, M_Q$.

Thus, the number of users that share one hop region—$Q$—can't exceed the cluster size: $Q \leq M_Q$.

The $N_P \times 1$ vector of pilot symbols transmitted by user q can be written $$r_{1,q} := \frac{1}{\sqrt{N_P}} 1_{4 \times 1} \otimes s_q,$$

where $1_{N_C \times 1}$ is a column vector with $N_C$ ones and $\otimes$ denotes the Kronecker product.

The vectors $r_{1,q}, q=1, \ldots, Q$ are orthonormal. Define the following $N_P \times 1$ complex vectors $r_{i,q}, i=1, \ldots, 4, q=1, \ldots, M_Q$.

$$r_{i,q} := \frac{1}{\sqrt{N_P}} \alpha_i \otimes s_q, \text{ with}$$

$$\alpha_1 := \begin{bmatrix} 1 \\ 1 \\ 1 \\ 1 \end{bmatrix}, \alpha_2 := \begin{bmatrix} -1 \\ -1 \\ 1 \\ 1 \end{bmatrix}, \alpha_3 := \begin{bmatrix} -1 \\ 1 \\ -1 \\ 1 \end{bmatrix}, \alpha_4 := \begin{bmatrix} 1 \\ -1 \\ -1 \\ 1 \end{bmatrix}.$$

The fact that, for each cluster, the scrambling sequences of users are orthogonal plays a role in the derivation of the algorithm.

Figure 4A:
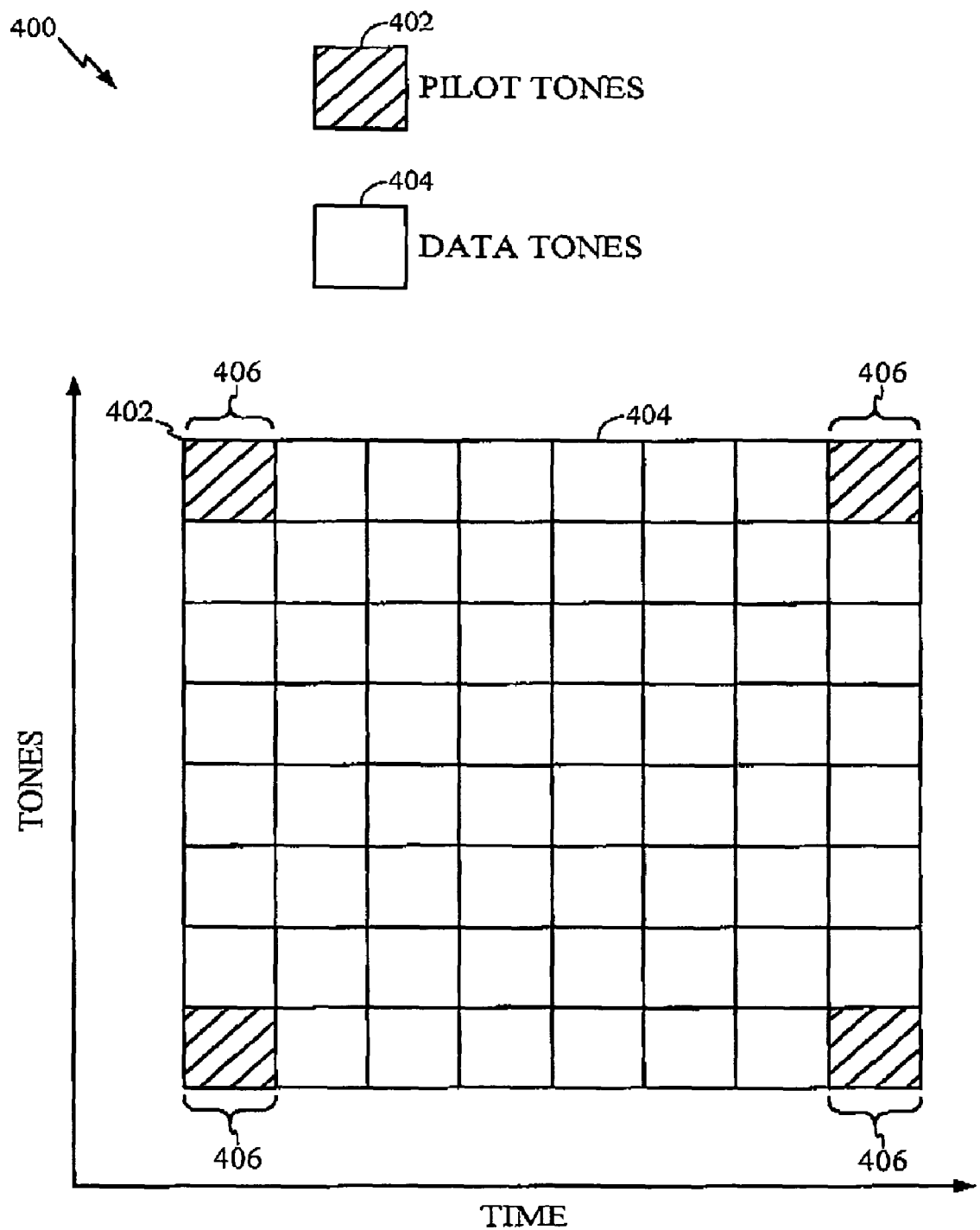
FIG. 4 illustrates a plurality of dedicated pilot symbols disposed among data symbols to enable concurrent estimation of channel characteristics and of interference level, in accordance with the present disclosure.
Figure 4B:
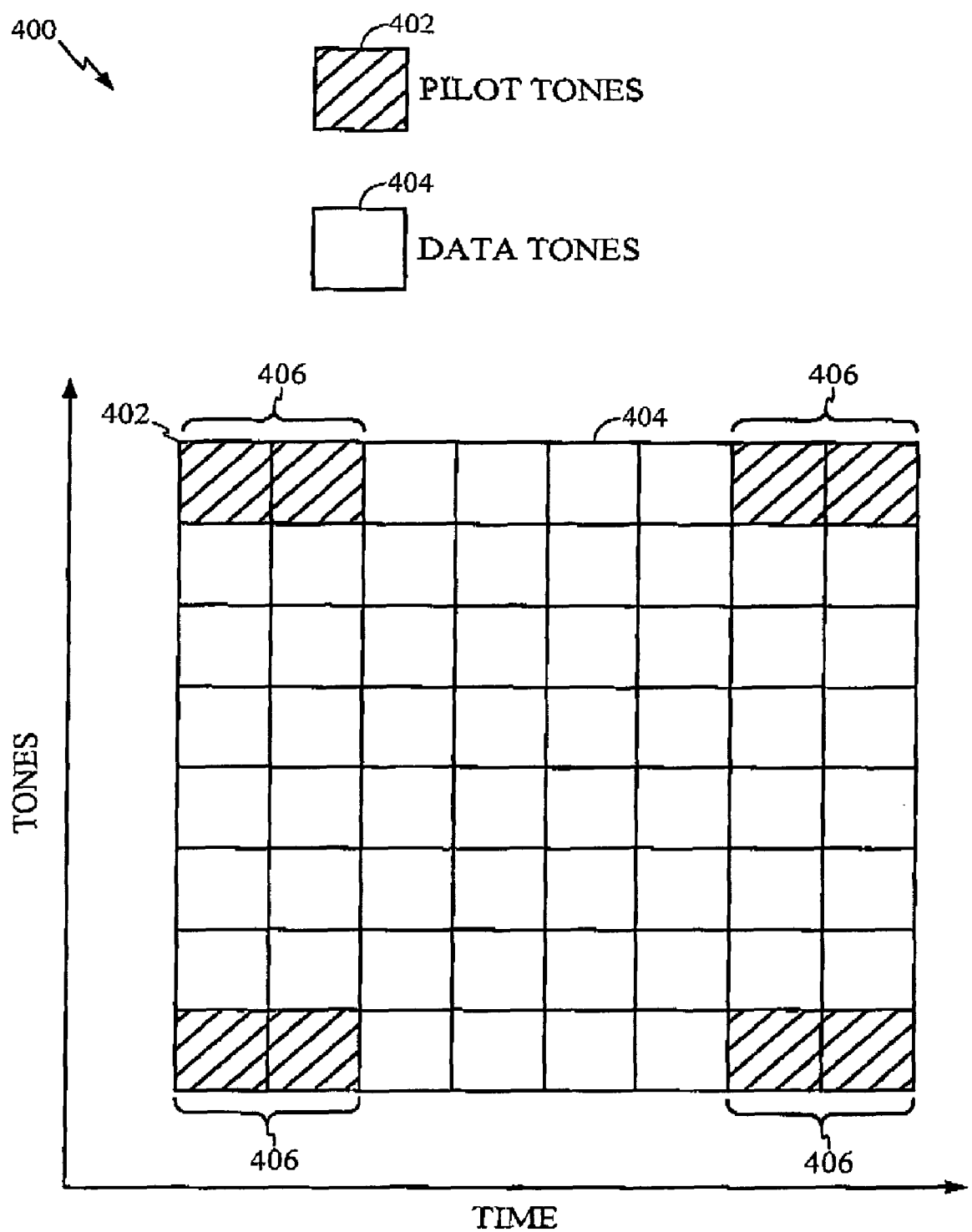
Figure 4C:
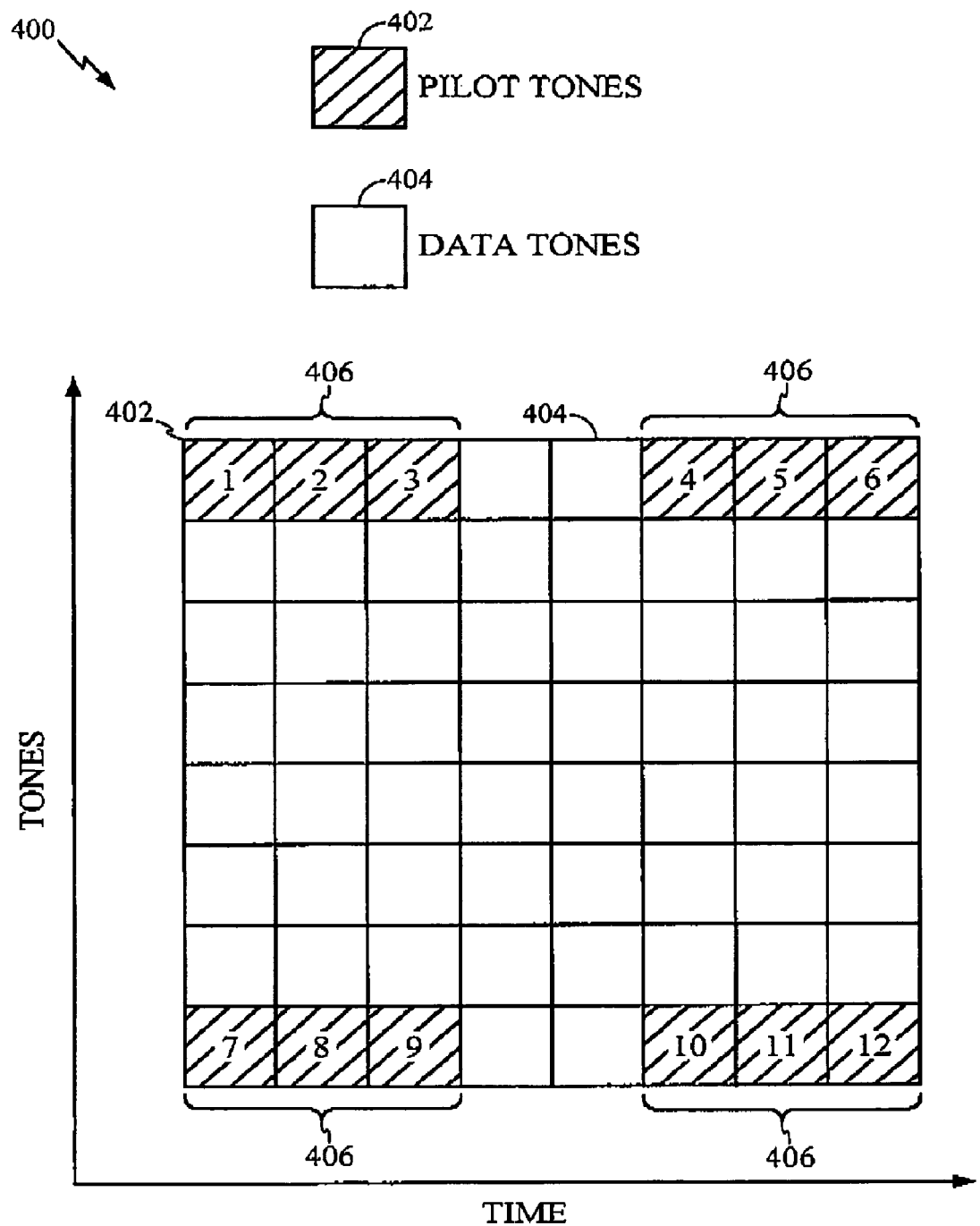
Figure 4D:
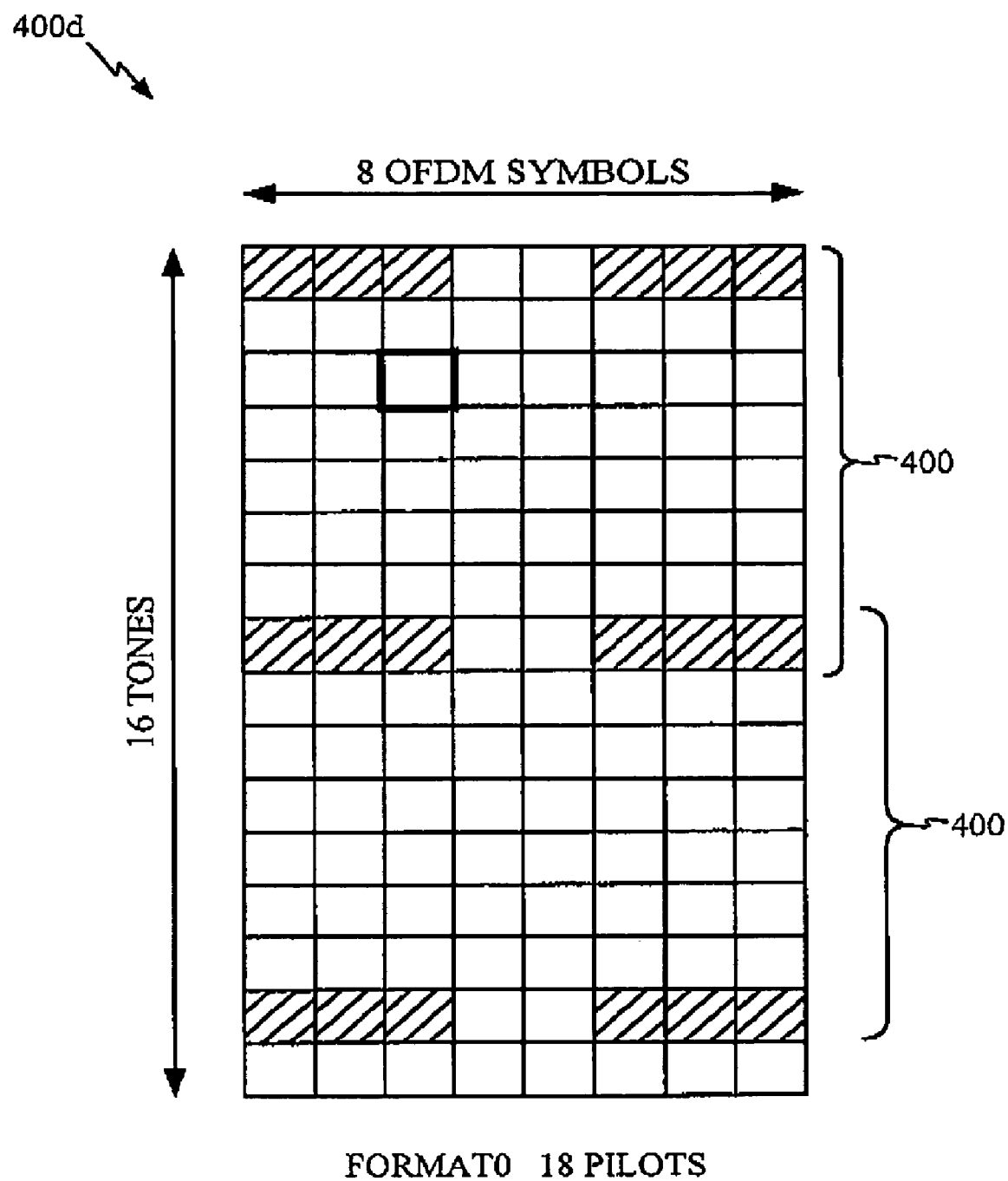

The channel and interference power are estimated using the received pilot symbols. We denote the vector of received pilot symbols by x, where x is an $N_P \times 1$ vector of complex numbers. Thus, the elements of x are those elements of y that correspond to pilot positions. The order of the elements of x is as follows. The first $M_Q$ elements of x correspond to the pilot symbols of the first (upper-left) cluster, the next of $M_Q$ elements of x correspond to the pilot symbols of the second (upper-right) cluster of pilot symbols of the same tone, the next $M_Q$ elements to the pilot symbols of the third (lower-left) cluster of pilot symbols and the last $M_Q$ elements correspond to the fourth (lower-right) cluster of pilot symbols. For example, in an embodiment illustrated in FIG. 4c, there are 12 pilots, and the pilots are read as 1, 2, 3, 4, 5, 6, 7, 8, 9, 10, 11, and 12 starting in the top left corner and reading across the top to the bottom left corner and across to the bottom right corner. Finally, we note that the received pilot symbols are placed in the vector x using a horizontal sweep, in contrast with the indexing of the received data symbols in vector y, where a vertical sweep is used.

A description of the Interference Estimation is provided. The information about the power of the interference is obtained using only the received pilot symbols. The observation space has $N_P$ dimensions; the channel of each user is given by three parameters; thus the remaining $N_P - 3Q$ dimensions of the observation space can be used to obtain information about the power of the interference.

The interference is estimated as the power of the projection of the received signal on the dimensions that are not occupied by the transmitted pilot signals. In other words, we project the received signal x onto the basis $r_{i,q}, i=1, \ldots, 4, q=1, \ldots, M_Q$ defined before and sum the power of the components corresponding to the interference.

If $w_{i,q}$ is defined as $w_{i,q} := r_{i,q}^H x$.

The power of the interference may be estimated by averaging the power of the samples obtained:

$$\hat{\sigma}^2 = \frac{1}{4M_Q - 3Q} \left( \sum_{q=1}^{Q} |w_{4,q}|^2 + \sum_{i=1}^{4} \sum_{q=Q+1}^{M_Q} |w_{i,q}|^2 \right)$$

The first sum would be an estimate of the noise power if the channel of each user had perfect linear variation in a tile. In practice however, it includes the channel modeling error.

The second sum exists only if $Q < M_Q$, and is the power of the received signal despread with spreading sequences orthogonal on the sequences of the transmitting users.

In one aspect, channel estimation is performed using the MMSE approach.

$$\hat{h}^{(q)} = E\{h^{(q)} x^H\} (E\{xx^H\})^{-1} x.$$

We have:

$$\Delta_q \hat{h}^{(q)} = \sum_{i=1}^{3} \frac{\Delta_q^2 \Lambda_i^{(q)} \beta_i}{\Delta_q^2 \Lambda_i^{(q)} \beta_i^2 + \hat{\sigma}^2} w_{i,q} U_i.$$

The quantities $\beta_i$ are provided below.

$$\beta_1 := \left( \sqrt{\frac{N_S N_T}{N_P}} \right)^{-1}, \beta_2 := \left( \sqrt{\frac{N_S N_T (N_T^2 - 1)}{3 N_P}} \frac{1}{N_T - \theta_T} \right)^{-1},$$

$$\beta_3 := \left( \sqrt{\frac{N_S N_T (N_S^2 - 1)}{3 N_P}} \frac{1}{N_S - \theta_S} \right)^{-1}.$$

The values $\theta_T$ and $\theta_S$ are obtained from the actual placement of the pilot symbols and they identify the center of the clusters of pilot symbols within a tile. More exactly, the center of the upper-left cluster of pilot symbols should be given by $$\left(\frac{\theta_S+1}{2}, \frac{\theta_T+1}{2}\right).$$

If the pilot symbols are placed in the top "row", then $\theta_T=1$, if they are in the second "row", then $\theta_T=3$, and so on.

Figure 3:
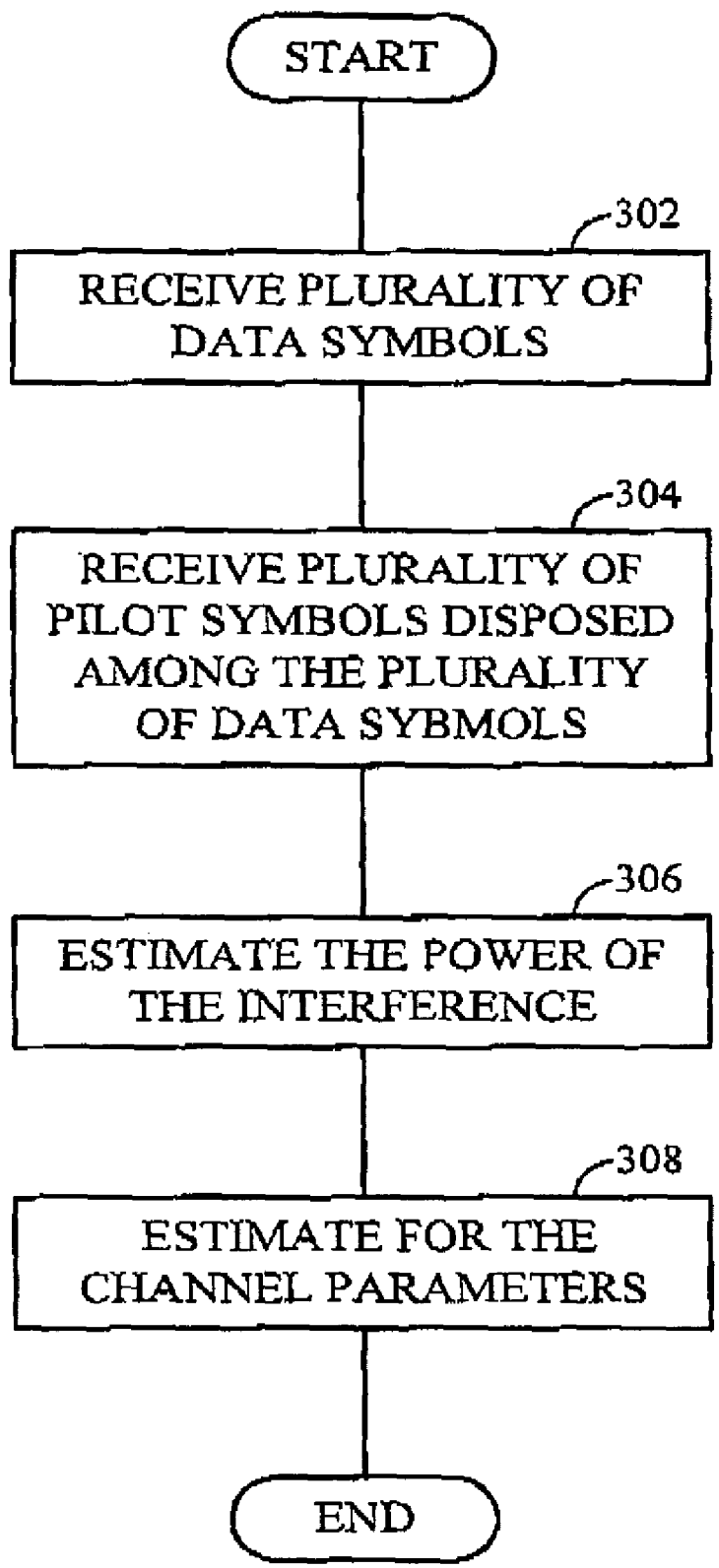
FIG. 3 illustrates a methodology of channel and interference estimation with dedicated pilot tones.

With regard to FIG. 3 a methodology of channel and interference estimation with dedicated pilot tones is illustrated. At block 402, a plurality of data symbols are received, and at block 404, a plurality of pilot symbols disposed among the plurality of data symbols are received. Once the pilot symbols are received the power of the interference for a time frequency region of interest is estimated at block 406. The use of the term frequency is used interchangeable with the term tone. Using the interference estimate from block 406, the channel parameters can be estimated at block 408.

With regard to FIG. 4, an embodiment with a subtile of dimension 8×8 is illustrated by block 400. FIG. 4a illustrates an embodiment with a subtile of dimension 8×8 with the number of pilots, block 401, $N_P=4$ and the number of pilot symbols in each cluster $M_Q=1$. Using the Interference Estimation provided, $N_P-3Q$ dimensions of the observation space can be used to obtain information about the power of the interference. 4−3=1. FIG. 4b illustrates an embodiment with a subtile dimension of 8×8, and we have block 402, $N_P=8$ and the number of pilot symbols in each cluster $M_Q=2$. Thus, $N_P-3Q=(8-6=2)$. In FIG. 4b the number of clusters, block 406, $N_C=4$. FIG. 4c illustrates and embodiment with a subtile of dimension 8×8 with block 402, $N_P=12$, block the number of pilots block 402 in each cluster $M_Q=3$ and the number of clusters block 406, $N_C=4$. While the embodiments described had a subtile with a dimension of 8×8, a subtile could be larger or smaller. The embodiments related to FIGS. 4a, 4b, and 4c are examples of how the interference for the subtile may be calculated in some embodiments. FIG. 4d illustrates an embodiment of a tile, 400d. The tile with a dimension of 16 tones×8OFDM symbols, block 400d is the result of two subtiles of dimension 8×8, block 400.

Figure 5:
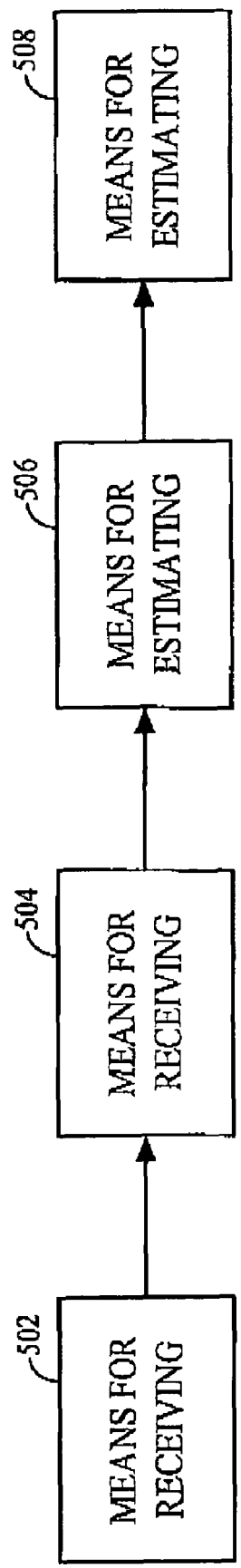
FIG. 5 illustrates a functional block diagram for estimating channel and interference with dedicated pilots.

Referring to FIG. 5, a functional block diagram for estimating channel and interference level of a wireless communication system 500 is illustrated. A plurality of data symbols transmitted over a channel is received at means for receiving 502. A plurality of dedicated pilot signals disposed among the plurality of data symbols and transmitted over the channel is received at means for receiving 504. In some embodiments the means for receiving data symbols and means for receiving pilot symbols may be combined in either means for receiving 502 or 504. The power of the interference for a time frequency region of interest is estimated at means for estimating 506. The channel parameters are estimated at means for estimating 508 using the estimate of the power of the interference provided by the means for estimating 506. In some embodiments the means for estimating the power of the interference 506 and the means for estimating the channel parameters may be combined in either means for estimating 506 or 508.

The channel and interference level estimation may be carried out using various codes of one or more software modules forming a program and executed as instructions/data by, e.g., a central processing unit, or using hardware modules specifically configured and dedicated to determine the channel and interference level. Alternatively, in some embodiments, the channel and interference level estimation may be carried out using a combination of software and hardware modules.

The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of estimating a channel and an interference level of a wireless communication system comprising:
    a processor-implemented act of executing computer executable instructions stored on a computer readable storage medium to implement the following:
        receiving a plurality of data symbols for one or more users transmitted over a shared time frequency region;
        receiving a plurality of dedicated pilot symbols, for the one or more users, disposed among the plurality of data symbols in the time frequency region; estimating a power of interference for the time frequency region, wherein the estimate of the power of interference $\hat{\sigma}^2$ comprises:

$$\hat{\sigma}^2 = \frac{1}{4M_Q - 3Q}\left(\sum_{q=1}^{Q}|w_{4,q}|^2 + \sum_{i=1}^{4}\sum_{q=Q+1}^{M_Q}|w_{i,q}|^2\right)$$

where the Q is a number of the one or more users that share the time frequency region, i is a number of cluster, $M_Q$ a number of the dedicated pilot symbols in a cluster, w is a power of interference, and q is a user; and
        estimating the channel parameters for the time frequency region using the estimate of the power of the interference.

2. The method of claim 1 wherein time frequency region corresponds to a time frequency region assigned for one of a forward link or a reverse link of a wireless communication system that is an OFDMA system.

3. The method of claim 1, further comprising determining a location of the time frequency region according to a frequency hopping algorithm.

4. The method of claim 1, wherein the plurality of dedicated pilot symbols are grouped into clusters of pilot symbols, the number of the one or more users that share the time frequency region is limited to not exceed the number of the dedicated pilot symbols in a cluster of pilot symbols in the time frequency region.

5. The method of claim 1, wherein the plurality of dedicated pilot symbols are divided into four clusters having an equal number of dedicated pilot symbols, and dedicated pilot symbols of a cluster occupy a contiguous region in the time frequency region, such that, for each user, variations of a channel within dedicated pilot symbols of one cluster are minimized, and a dedicated pilot symbol placement scheme is symmetric with respect to a center of symmetry of the time frequency region.

6. The method of claim 1, wherein estimating the power of the interference comprises determining a single interference estimate for all of the data symbols in the time-frequency region.

7. The method of claim 1, wherein estimating the power of the interference comprises estimating the power of the interference for the time frequency region on the forward link for a plurality of layers even if a layer is not intended for the one or more users.

8. A wireless communication apparatus comprising:

a processor;

a memory communicatively coupled to the processor, the memory having stored therein computer-executable instructions to implement the system, including:

a receiver configured to receive a plurality of data symbols for one or more users over a time-frequency region, the receiver configured to receive a plurality of dedicated pilot symbols for the one or more users, the plurality of dedicated pilot symbols disposed among the plurality of data symbols and transmitted over the time-frequency region;

an estimator configured to estimate a power of interference for the time-frequency region, wherein the estimate of the power of interference $\hat{\sigma}^2$ comprises:

$$\hat{\sigma}^2 = \frac{1}{4M_Q - 3Q} \left( \sum_{q=1}^{Q} |w_{4,q}|^2 + \sum_{i=1}^{4} \sum_{q=Q+1}^{M_Q} |w_{i,q}|^2 \right)$$

where the Q is a number of the one or more users that share the time frequency region, i is a number of cluster, $M_Q$ a number of the dedicated pilot symbols in a cluster, w is a power of interference, and q is a user; and an estimator configured to estimate channel parameters for the time-frequency region using the estimate of the power of the interference.

9. The apparatus of claim 8, wherein the time-frequency region corresponds to a time-frequency region assigned for one of a forward or a reverse link of a wireless communication system that is an OFDMA system.

10. The apparatus of claim 8, further comprising determining a location of the time-frequency region according to a frequency hopping algorithm.

11. The apparatus of claim 8, wherein the plurality of dedicated pilot symbols are grouped into clusters of pilot symbols, the number of the one or more users that share the time frequency region is limited to not exceed the number of the dedicated pilot symbols in a cluster of pilot symbols in the time frequency region.

12. The apparatus of claim 8, wherein the plurality of dedicated pilot symbols are divided into four clusters having an equal number of dedicated pilot symbols, and dedicated pilot symbols of a cluster occupy a contiguous region in the time frequency region, such that, for each user, variations of a channel within dedicated pilot symbols of one cluster are minimized, and a dedicated pilot symbol placement scheme is symmetric with respect to a center of symmetry of the time frequency region.

13. The apparatus of claim 8, wherein estimating the power of the interference comprises determining a single interference estimate for all of the data symbols in the time-frequency region.

14. The apparatus of claim 8, wherein estimating the power of the interference comprises estimating the power of the interference for the time frequency region on the forward link for a plurality of layers even if a layer is not intended for the one or more users.

15. A system of estimating a channel and an interference level of a wireless communication system comprising:

a processor;

a memory communicatively coupled to the processor, the memory having stored therein computer-executable instructions to implement the system, including:

means for receiving a plurality of data symbols for one or more users transmitted over a time frequency region;

means for receiving a plurality of dedicated pilot symbols, for the one or more users, disposed among the plurality of data symbols in the time frequency region;

means for estimating the power of the interference for the time frequency region, wherein the estimate of the power of interference $\hat{\sigma}^2$ comprises:

$$\hat{\sigma}^2 = \frac{1}{4M_Q - 3Q} \left( \sum_{q=1}^{Q} |w_{4,q}|^2 + \sum_{i=1}^{4} \sum_{q=Q+1}^{M_Q} |w_{i,q}|^2 \right)$$

where the Q is a number of the one or more users that share the time frequency region, i is a number of cluster, $M_Q$ a number of the dedicated pilot symbols in a cluster, w is a power of interference, and q is a user; and means for estimating the channel parameters, for the time frequency region, using the estimate of the power of the interference.

16. The system of claim 15, wherein the time-frequency region corresponds to a time-frequency region assigned to one of a forward link or a reverse link of a wireless communication system that is an OFDMA system.

17. The system of claim 15, further comprising means for determining a location of the time frequency region according to a frequency hopping algorithm.

18. The system of claim 15, wherein the plurality of dedicated pilot symbols are grouped into clusters of pilot symbols, the number of the one or more users that share the time frequency region is limited to not exceed the number of the dedicated pilot symbols in a cluster of pilot symbols in the time frequency region.

19. The system of claim 15, wherein the plurality of dedicated pilot symbols are divided into four clusters having an equal number of dedicated pilot symbols, and dedicated pilot symbols of a cluster occupy a contiguous region in the time frequency region, such that, for each user, variations of a channel within dedicated pilot symbols of one cluster are minimized, and a dedicated pilot symbol placement scheme is symmetric with respect to a center of symmetry of the time frequency region.

20. The system of claim 15, wherein means for estimating the power of the interference comprises means for determining a single interference estimate for all of the data symbols in the time-frequency region.

21. The system of claim 15, wherein means for estimating the power of the interference comprises means for estimating the power of the interference for the time frequency region on the forward link for a plurality of layers even if a layer is not intended for the one or more users.

22. A computer readable medium comprising instructions thereon, the instructions comprising:
    instructions for receiving a plurality of data symbols for one or more users transmitted over a channel;
    instructions for receiving a plurality of dedicated pilot symbols for one or more users disposed among the plurality of data symbols and transmitted over the channel;
    instructions for estimating a power of interference for the time frequency region of interest, wherein the estimate of the power of interference $\hat{\sigma}^2$ comprises:

$$\hat{\sigma}^2 = \frac{1}{4M_Q - 3Q}\left(\sum_{q=1}^{Q}|w_{4,q}|^2 + \sum_{i=1}^{4}\sum_{q=Q+1}^{M_Q}|w_{i,q}|^2\right)$$

where the Q is a number of the one or more users that share the time frequency region, i is a number of cluster, $M_Q$ a number of the dedicated pilot symbols in a cluster, w is a power of interference, and q is a user; and
    instructions for estimating channel parameters for the time frequency region of interest using the estimate of the power of the interference.

* * * * *